US006609597B1

(12) United States Patent
Heideman

(10) Patent No.: US 6,609,597 B1
(45) Date of Patent: Aug. 26, 2003

(54) DAMPENING APPARATUS

(75) Inventor: Robert Heideman, Westland, MI (US)

(73) Assignee: Enertrols, Inc., Westland, MI (US)

( * ) Notice: Subject to any disclaimer, the term of this patent is extended or adjusted under 35 U.S.C. 154(b) by 0 days.

(21) Appl. No.: 10/068,724

(22) Filed: Feb. 6, 2002

(51) Int. Cl.[7] ................................................. F16F 9/52
(52) U.S. Cl. ........................ 188/276; 188/270; 188/295; 188/303; 188/304; 91/5
(58) Field of Search ................................. 188/378, 380, 188/266, 266.3, 266.5, 266.6, 270, 276, 282.7, 288, 295, 297, 302, 303, 304, 284, 305; 91/5, 433; 60/468

(56) References Cited

U.S. PATENT DOCUMENTS

| | | | |
|---|---|---|---|
| 2,454,081 A | | 11/1948 | Molloy et al. |
| 2,604,953 A | | 7/1952 | Campbell |
| 2,801,587 A | | 8/1957 | Gould |
| 2,932,951 A | * | 4/1960 | Ottestad ....................... 91/396 |
| 3,596,774 A | | 8/1971 | MacCurdy |
| 4,448,338 A | * | 5/1984 | Graf et al. ...................... 227/8 |
| 4,693,454 A | | 9/1987 | Tsuchiya et al. |
| 4,776,440 A | | 10/1988 | Yamada et al. |
| 4,778,127 A | | 10/1988 | Duchesneau |
| 4,827,829 A | * | 5/1989 | Stoner ........................ 89/43.01 |
| 4,834,088 A | * | 5/1989 | Jeanson ....................... 188/298 |
| 5,159,997 A | * | 11/1992 | Heideman et al. ........ 188/282.1 |
| 5,185,999 A | * | 2/1993 | Behchaar ..................... 60/404 |
| 5,347,771 A | * | 9/1994 | Kobori et al. .............. 52/167.1 |
| 5,386,893 A | * | 2/1995 | Feigel ..................... 188/266.5 |
| 5,392,885 A | * | 2/1995 | Patzenhauer et al. ..... 188/282.1 |
| 5,522,221 A | * | 6/1996 | Kadlicko et al. .............. 60/413 |
| 5,810,128 A | * | 9/1998 | Eriksson et al. ............. 188/289 |
| 5,829,715 A | | 11/1998 | Banks |
| 6,446,771 B1 | * | 9/2002 | Sintorn et al. ............... 188/288 |

\* cited by examiner

*Primary Examiner*—Christopher P. Schwartz
*Assistant Examiner*—Devon Kramer
(74) *Attorney, Agent, or Firm*—Young & Basile, P.C.

(57) ABSTRACT

A dampening apparatus for dampening an actuating member over a wide array of temperatures. The present invention provides a fluid filled housing having a first chamber, a second chamber, and a passageway therebetween. A first piston is slidably received within the first chamber for movement from a pre-actuated position to an actuated position. A second piston is slidably received within said second chamber for movement from said pre-actuated position to said actuated position. A spring disposed within the second chamber biases the second piston toward said passageway and maintains a constant level of fluid pressure within the housing regardless of the temperatures of the fluid. An exhaust port is in communication with the second chamber wherein the second piston is disposed between the passageway and the exhaust port in the pre-actuated position, and wherein the exhaust port is located between the passageway and the second piston in the actuated position to allow the fluid to escape through the exhaust port. A positioning member is connected to the housing and the first piston for positioning and holding the first piston in the pre-actuated position wherein the positioning member releases the first piston under a predetermined load applied by an actuating member to the first piston allowing the first piston to be driven to the actuated position.

18 Claims, 2 Drawing Sheets

DAMPENING APPARATUS

FIELD OF THE INVENTION

The present invention relates to a dampening apparatus, and more particularly, a compact dampening apparatus that provides consistent performance characteristics over a wide range of temperatures.

BACKGROUND OF THE INVENTION

In order to draw enemy fire from an aircraft, drones have been developed that are pulled behind the aircraft by a cable connected to the aircraft. The drone attracts enemy missile fire by having the guidance system of the missile lock onto the drone as opposed to the aircraft. If such an event occurs, the drone is destroyed at a sufficiently safe distance from the aircraft so as to prevent any damage to the aircraft.

In deploying the drones, the drones are typically released from the rear end of the aircraft while the aircraft is in flight. The drone is provided with fins which provide directional control and aerodynamic stability during flight. Prior to the drones being deployed from the aircraft, the fins are typically folded in a stored position about the drone body in order to conserve storage space and to minimize handling and launching problems. The fins are deployed at the same time in which the drone is released from the aircraft. A spring actuated device deploys the fins in a quick manner so that the drone may immediately take advantage of the aerodynamic benefits of the fins. However, if the fins of the drone deploy too quickly, the fins may engage the rear portion of the aircraft thereby damaging the aircraft or the fins of the drone. The deployment of the fins must be slowed or dampened a sufficient degree to ensure that the fins do not engage the rear of the aircraft while also ensuring that the fins deploy sufficiently fast enough so that the drone may immediately benefit from the aerodynamic stability and directional control provided by the fins.

The aircraft utilizing the drones may deploy the drones at a wide variety of elevations. Such elevations create a wide array of temperatures for which the drones are utilized. Conventional shock absorbers and dampeners cannot provide consistent performance characteristics over such a wide array of temperatures because they typically utilize a fluid medium which expands and contracts under such temperatures. Due to the precision that is required in deploying the drones from an aircraft, any dampener or shock absorber developed to dampen the deployment of the fins of the drone must provide consistent performance characteristics regardless of the temperature. In addition, the area in which the shock absorbers and dampeners must operate on the drone is relatively small thereby requiring such a device to be compact and somewhat aerodynamic.

It would be desirable to provide a compact, inexpensive dampening apparatus that provides consistent and accurate performance characteristics over a wide array of temperatures.

SUMMARY OF THE INVENTION

The present invention provides a compact dampening apparatus that provides consistent performance characteristics over a wide array of temperatures. The invention provides a fluid filled housing having a first chamber, a second chamber, and a passageway therebetween. A first piston is slidably received within the first chamber of the housing for movement from a pre-actuated position to an actuated position. A second piston is slidably received within the second chamber of the housing for movement from the pre-actuated position to the actuated position. A spring is disposed within the second chamber for biasing the second piston toward the passageway and maintaining a constant level of fluid pressure within each chamber of the housing. An exhaust port communicates with the second chamber wherein the second piston is disposed between the passageway and the exhaust port in the pre-actuated position, and wherein the exhaust port is located between the passageway and the second piston when in the actuated position to allow fluid to escape through the exhaust port.

The first and the second chambers of the housing each have longitudinal axes that are substantially parallel to one another. The passageway connecting the first and second chambers has a longitudinal axis that is substantially perpendicular to the longitudinal axes of the first and second chambers. The passageway has a cross-sectional opening that is smaller than the smallest cross-sectional opening of the first and second chambers.

A positioning member is connected to the housing and the first piston for positioning and holding the first piston in the pre-actuated position. A positioning member releases the first piston under a predetermined load applied to the first piston allowing the first piston to be driven to the actuated position. The first piston is engageable with an actuating member to dampen the speed at which the actuating member actuates.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
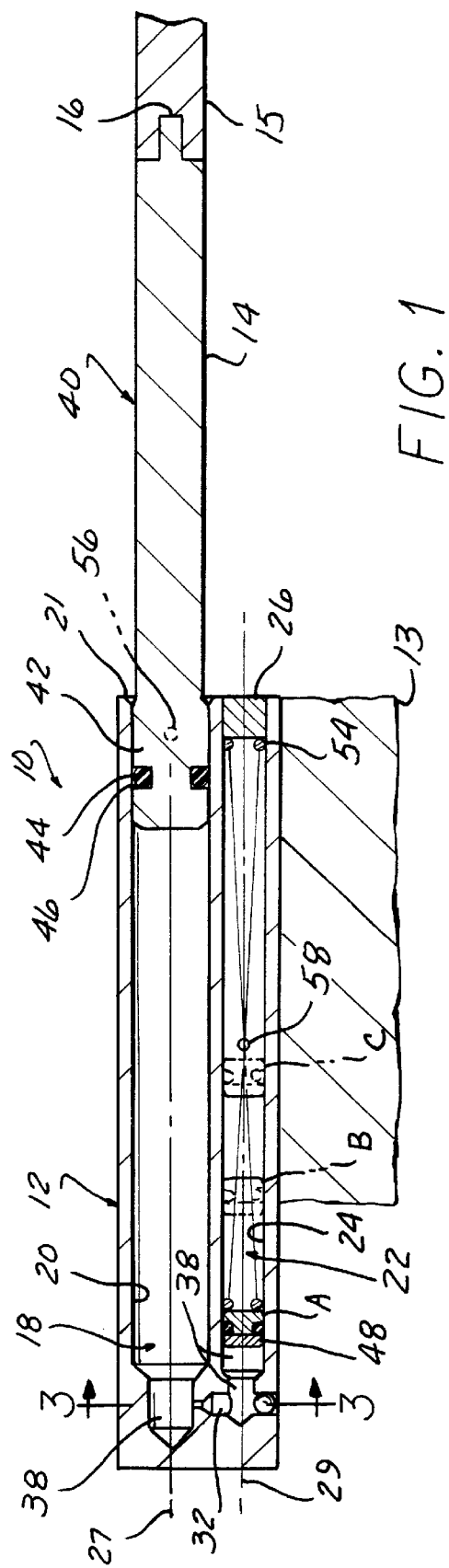
FIG. 1 is a cross-sectional view of the dampening apparatus of the present invention in the pre-actuated Position.

Referring to the drawings, the present invention will now be described in detail with reference to the preferred embodiment.

FIGS. 1–5 illustrate a dampening apparatus 10 as defined in the present invention. The dampening apparatus 10 provides a fluid filled enclosed housing 12 having a piston rod 14 extending outwardly from the housing 12. The housing 12 of the dampening apparatus 10 is mounted to a drone 13 for use with an aircraft (not shown) wherein the piston rod 14 has an end 16 connected to or in contact with a fin 15 of the drone 13. The present invention is not limited to the dampening apparatus 10 being utilized in conjunction with the fin 15 of the drone 13, but rather, the dampening apparatus 10 may be utilized in conjunction with any actuating member which requires the dampening of a deploying or actuating member. In addition, the dampening apparatus 10 is best suited for those applications which experience a wide array of temperatures as with the deployment of the drone 13 from an aircraft.

In order to make the dampening apparatus 10 lightweight, strong and inexpensive, the housing 12 is fabricated from a substantially rectangular block of extruded aluminum. The housing 12 includes a first chamber 18 formed by an open-ended bore 20 extending through an end wall 21 of the housing 12 along the longitudinal length of the housing 12. The housing 12 also provides a second chamber 22 formed by a close-ended bore 24. The close-ended bore 24 is closed by a spring retainer 26 which is press-fit into an opening of the bore 24 in the end wall 21 of the housing 12. The bore 24 is initially open-ended in order to machine the bore 24 in the housing 12. A longitudinal axis 29 of the second chamber 22 of the housing 12 and a longitudinal axis 27 of the first chamber 18 of the housing are substantially parallel and axially spaced with respect to one another.

The first chamber 18 and the second chamber 22 of the housing 12 communicate with one another via a small passageway 32 that connects the first chamber 18 to the second chamber 22. The passageway 32 includes a larger diameter bore 35, having a side portion that intersects with a side portion of the second chamber 22, and a smaller diameter bore 37 that wholly intersects with the first chamber 18 of the housing 12. The smaller diameter bore 37 of the passageway 32 has a smaller cross-sectional area than the smallest cross-sectional area of either the first chamber 18 or the second chamber 22. The larger diameter bore 35 of the passageway 32 extends from a bottom wall 31 of the housing 12, and a ball stop 34 is press-fit into the larger bore 35 of the passageway 32. The larger bore 35 of the passageway 32 may be utilized to fill the housing 12 with a fluid medium 38, such as oil, prior to press-fitting the ball stop 34 into the bore 35 of the passageway 32. The passageway 32 has a longitudinal axis 39 that is substantially perpendicular to the longitudinal axes 28, 30 of the first and second chambers 18, 22, respectively.

Figure 2:
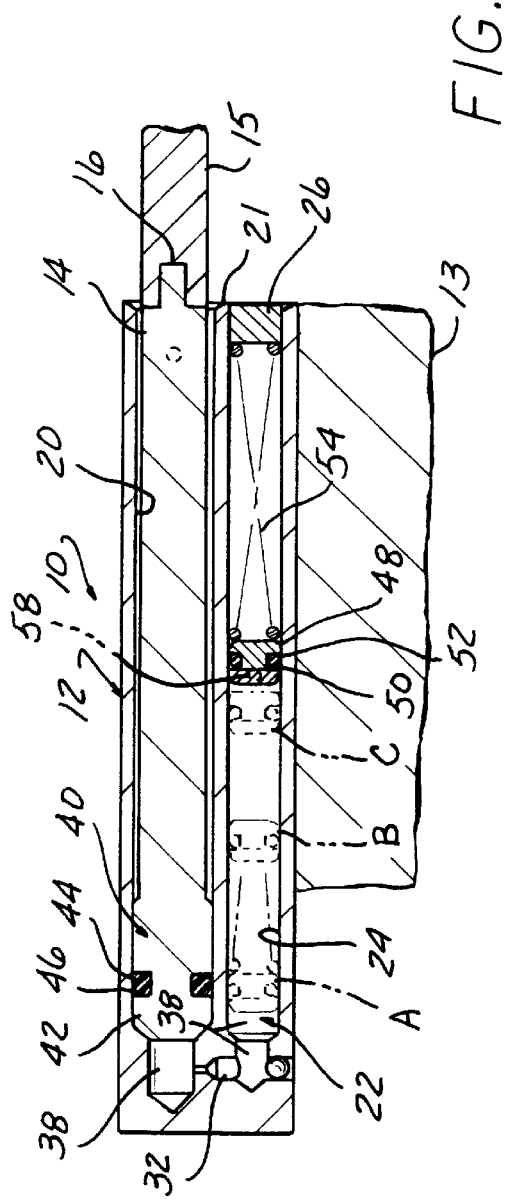
FIG. 2 is a cross-sectional view of the dampening apparatus of the present invention shown in the actuated position.
Figure 3:
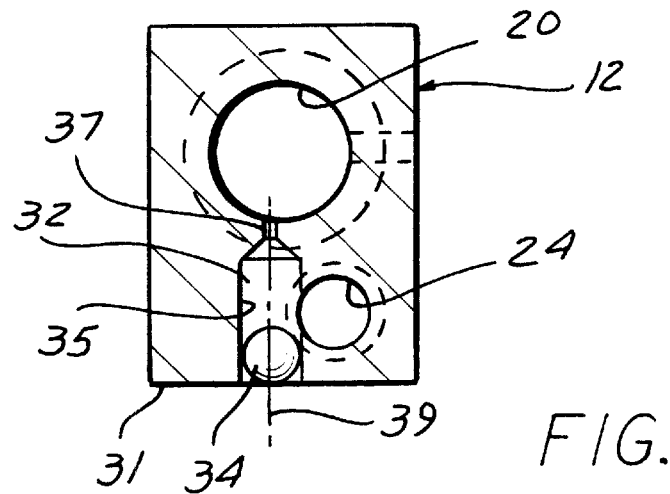
FIG. 3 is a cross-sectional view of the dampening apparatus taken in the direction of arrows 3—3 in FIG. 1
Figure 4:
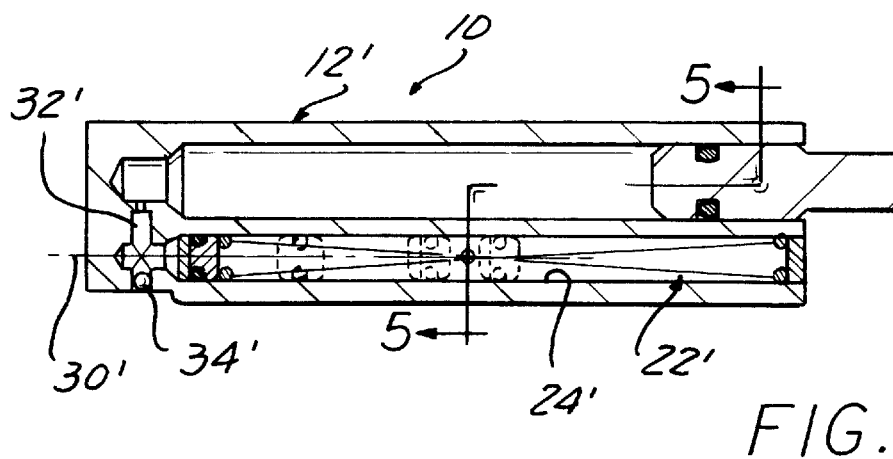
FIG. 4 is cross-sectional view of a second embodiment of the dampening apparatus of the present invention own in the pre-actuated position.
Figure 5:
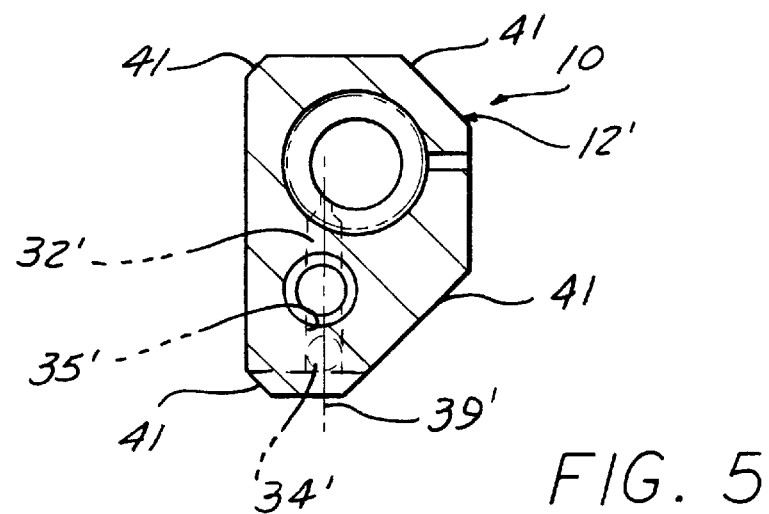
FIG. 5 is cross-sectional view of the second embodiment of the dampening apparatus taken in the direction of arrows 5—5 in FIG. 4.

To dampen the actuation of an actuation member (not shown) or the deployment of the fin 15 of the drone 13, a first or actuator piston 40 is slidably received within the first chamber 18 of the housing 12. The first piston 40 includes a piston head 42 that slidably and sealably engages the bore 20 of the first chamber 18. A piston seal 44 is disposed within a recess 46 of the piston head 42 to provide a sealed engagement between the piston head 42 and the interior walls of the bore 20 of the first chamber 18. The piston rod 14 is integrally connected to the piston head 42 and extends outwardly from the open end of the bore 20 of the first chamber 18. The sliding engagement of the first piston 40 within the first chamber 18 of the housing 12 allows the first piston 40 to slide from a pre-actuation position, as shown in FIG. 1, to an actuated position, as shown in FIG. 2.

To compensate for a change in fluid volume due to temperature changes in the fluid medium 38, a second or accumulator piston 48 is slidably received within the second chamber 22 of the housing 12. The second piston 48 has an hourglass cross-section with a piston seal 50 disposed within a recess 52 of the second piston 48 in order to provide a sealing engagement between the second piston 48 and the bore 24 of the second chamber 22. A compression spring 54 is disposed within the second chamber 22 between the spring retainer 26 and the second piston 48. The spring 54 biases the second piston 48 toward the passageway 32 and against the fluid medium 38. The second piston 48 and the spring 54 compensate for the varying temperatures of the fluid medium 38 by maintaining a constant level of fluid pressure within the first and second chambers 18, 22 of the housing 12. As seen in FIG. 1, when the second piston 48 is in position A or in the position closest to the passageway 32, the temperature of the fluid medium corresponds to approximately −65° F. The cold temperature of the fluid 38 causes the fluid 38 to contract, thereby allowing the second piston 48 to move toward the passageway 32 and maintain a constant level of fluid pressure within each chamber 18, 22 of the housing 12. When the second piston 48 is in position B or in the middle position, as shown in the phantom line in FIG. 1, the temperature of the fluid 38 is approximately 70° F. Since the temperature of the fluid 38 is warmer at position B than position A, the fluid 38 expands, thereby forcing the second piston 48 to move away from the passageway 32 by contracting the spring 54. When the second piston 48 is in position C or in the position furthest from the passageway 32, as shown in phantom line in FIG. 1, the temperature of the fluid 38 is approximately 185° F. The fluid 38 expands the most at these elevated temperatures, thereby requiring the second piston 48 to move further away from the passageway 32 by contracting the spring 54 even further. The above-noted positions of the second piston 48 in the second chamber 22 are all related to the pre-actuated position of the dampening apparatus 10.

In a second embodiment, the housing 12' may be fabricated such that the longitudinal axis 39' of the passageway 32' intersects with the longitudinal axis 30' of the bore 24' of the second chamber 22'. This simplifies the machining of the passageway 32' by providing larger tolerances to ensure that the passageway 32' crosses and communicates with the second chamber 22'. A ball stop 34' is utilized to seal the larger bore 35' of passageway 32'. The alignment of the longitudinal axis 30' of the second chamber 22' with the longitudinal axis 39' of the passageway 32' allows for chamfers 41 on the corners of the housing 12' in order to reduce the cost and weight of the dampening apparatus 10. The remainder of the second embodiment is similar to that of the first embodiment.

In operation, the dampening apparatus 10 may be mounted to the drone 13 such that the piston rod 14 is connected to the fin 15 of the drone 13 when the fin 15 is in its retracted position. When the fin 15 is retracted, the piston rod 14 is fully extended from the housing 12 in the pre-actuated position, as seen in FIG. 1. The first piston 40 is maintained in the pre-actuated position by a shear pin 56 that extends from the housing 12 and into the piston head 42 of the first piston 40. When in the pre-actuated position, the second piston 48 in the second chamber 22 is located between the passageway 32 and an exhaust port 58, depending on the temperature of the fluid 38 as previously described. The exhaust port 58 is a small aperture which extends through the housing 12 and into the second chamber 22.

When the fin 15 of the drone 13 is deployed, the force of the fin 15 on the piston rod 14 shears the shear pin 56 and forces the first piston 40 against the fluid 38 thereby creating a high pressure chamber within the first chamber 18 of approximately 4000 psi. The first piston 40 proceeds to travel the length of the first chamber 18 of the housing 12 toward the passageway 32. By the first piston 40 traveling the length of the first chamber 18, the fluid 38 disposed within the first chamber 18 is forced through the passageway 32 and into the second chamber 22 of the housing 12. Due to the small bore 37 of the passageway 32 and the yielding of spring 54, the second chamber 22 is maintained at a low fluid pressure of approximately 100 psi. The force of the fluid 38 forces the second piston 48 against the spring 54 and away from the passageway 32 until the second piston 48 extends beyond the exhaust port 58. Once the exhaust port 58 is exposed to the fluid 38, the fluid 38 escapes through the exhaust port and into the atmosphere or some other collection device. By having the spring biased second piston 48 maintain constant fluid pressure within each chamber 18, 22 of the housing 12, the first piston 40 travels at a constant and steady rate regardless of the temperature. The dampening apparatus 10 may either be discarded or rebuilt after actuation of the apparatus 10.

While the invention has been described in connection with what is presently considered to be the most practical and preferred embodiment, it is to be understood that the invention is not to be limited to those disclosed embodiments, but on the contrary, it is intended to cover various modifications and equivalent arrangements included within the spirit and scope of the appended claims which scope is to be accorded the broadest interpretation so as to encompass all such modifications and equivalent structures as is permitted under the law.

What is claimed:

1. A dampening apparatus, comprising:
   a fluid filled housing having a first chamber, a second chamber, and a passageway therebetween, and said second chamber having an end and an exhaust port;
   a first piston slidably received within said first chamber for movement from a pre-actuated position to an actuated position;
   a second piston slidably received within said second chamber for movement from said pre-actuated position to said actuated position;
   a spring disposed within said second chamber for biasing said second piston toward said passageway, and said second piston moving between said end of said second chamber and said exhaust port of said second chamber in said pre-actuated position in response to unequal forces across said second piston caused by said fluid pressure and said spring in order to maintain a constant level of fluid pressure within said first and second chambers of said housing; and
   said exhaust port in communication with said second chamber wherein said second piston is disposed between said passageway and said exhaust port in said pre-actuated position, and wherein said exhaust port is located between said passageway and said second piston in said actuated position to allow said fluid to escape through said exhaust port.

2. The dampening apparatus stated in claim 1, further comprising:
   said first chamber having an open end and a longitudinal axis.

3. The dampening apparatus stated in claim 1, further comprising:
   said first piston engageable with an actuating member to dampen the speed at which said actuating member actuates.

4. A dampening apparatus comprising:
   a fluid filled housing having a first chamber, a second chamber and a passageway therebetween;
   a first piston slidably received within said first chamber for movement from a pre-actuated position to an actuated position;
   a second piston slidably received within said second chamber for movement from said pre-actuated position to said actuated position.
   a spring disposed within said second chamber for biasing said second piston toward a passageway and maintaining a constant level of fluid pressure within said first and second chambers of said housing;
   an exhaust port in communication with said second chamber wherein said second piston is disposed between said passageway and said exhaust port in said pre-actuated position, and wherein said exhaust port is located between said passageway and said second piston in said actuated position to allow said fluid to escape through said exhaust port;
   said first chamber having an open end and a longitudinal axis; and
   said second chamber having a longitudinal axis wherein said longitudinal axis of said first chamber is substantially parallel to said longitudinal axis of said second chamber.

5. The dampening apparatus stated in claim 4, further comprising:
   said passageway having a longitudinal axis that is substantially perpendicular to said longitudinal axes of said first chamber and said second chamber.

6. A dampening apparatus comprising:
   a fluid filled housing having a first chamber, a second chamber and a passageway therebetween;
   a first piston slidably received within said first chamber for movement from a pre-actuated position to an actuated position;
   a second piston slidably received within said second chamber for movement from said pre-actuated position to said actuated position;
   a spring disposed within said second chamber for biasing said second piston toward a passageway and maintaining a constant level of fluid pressure within said first and second chambers of said housing;
   an exhaust port in communication with said second chamber wherein said second piston is disposed between said passageway and said exhaust port in said pre-actuated position and wherein said exhaust port is located between said passageway and said second piston in said actuated position to allow said fluid to escape through said exhaust port; and
   said passageway having a smaller cross-sectional opening than the smallest cross-sectional opening of said first and second chambers.

7. A dampening apparatus, comprising:
   a fluid filled housing having a first chamber, a second chamber and a passageway therebetween;
   first piston slidably received within said first chamber for movement from a pre-actuated position to an actuated position;
   a second piston slidably received within said second chamber for movement from said pre-actuated position to said actuated position;
   a spring disposed within said second chamber for biasing said second piston toward a passageway and maintaining a constant level of fluid pressure within said first and second chambers of said housing;
   an exhaust port in communication with said second chamber wherein said second piston is disposed between said passageway and said exhaust port in said pre-actuated position, and wherein said exhaust port is located between said passageway and said second piston in said actuated position to allow said fluid to escape through said exhaust port; and
   a positioning member connected to said housing and said first piston for positioning and holding said first piston in said pre-actuated position wherein said positioning member releases said first piston under a predetermined load applied to said first piston allowing said first piston to be driven to said actuated position.

8. A dampening apparatus, comprising:

a fluid filled housing having a fluid pressure therein and having a first open-ended bore, a second bore, and a passageway therebetween, and said second bore having an end and an exhaust port;

an actuator piston having a piston head and a piston rod integrally connected thereto, wherein said piston head is slidably received within said first bore, and said piston rod extends outward from the open end of said first bore for movement from a pre-actuated position to an actuated position;

an accumulator piston slidably received within said second bore for movement from said pre-actuated position to said actuated position;

a spring disposed within said second bore for biasing said accumulator piston toward said passageway, and said accumulator piston moving between said end and said exhaust port of said second bore in said pre-actuated position in response to unequal forces across said accumulator piston caused by said fluid pressure and said spring in order to maintain a constant level of fluid pressure within said first and second bores of said housing; and said exhaust port in communication with said second bore wherein said second piston rests in a position between said passageway and said exhaust port in said pre-actuated position in response to said fluid pressure and said spring, and wherein said accumulator piston rests in a position such that said exhaust port is located between said passageway and said accumulator piston when in said actuated position in response to said fluid pressure and said spring to allow said fluid to escape through said exhaust port.

9. The dampening apparatus stated in claim 8, further comprising:

said piston rod engageable with an actuating member to dampen the speed at which the actuating member deploys from a pre-actuated position.

10. A dampening apparatus comprising:

a fluid filled housing having a first open-ended bore, a second bore, and a passageway therebetween;

an actuator piston having a piston head and a piston rod integrally connected thereto, wherein said piston head is slidably received within said first bore and said piston rod extends outward from the open end of said first bore for movement from a pre-actuated position to an actuated position:

an accumulator piston slidably received within said second bore for movement from said pre-actuated position to said actuated position;

a spring disposed within said second bore for biasing said accumulator piston toward said passageway and maintaining a constant level of fluid pressure within said first and second bores of said housing;

an exhaust port in communication with said second bore wherein said accumulator piston is disposed between said passageway and said exhaust port in said pre-actuated position, and wherein said accumulator piston is biased so that said exhaust port; is located between said passageway and said accumulator piston when in said actuated position to allow said fluid to escape through said exhaust port; and said first bore and said second bore each having a longitudinal axis wherein said longitudinal axes are substantially parallel and axially spaced.

11. The dampening apparatus stated in claim 10, further comprising:

said passageway having a longitudinal axis that is substantially perpendicular to said longitudinal axes of said first bore and said second bore.

12. A dampening apparatus, comprising:

a fluid filled housing having a first open-ended bore, a second bore, and a passageway therebetween;

an actuator piston having a piston head and a piston rod integrally connected thereto, wherein said piston head is slidably received within said first bore, and said piston rod extends outward from the open end of said first bore for movement from a pre-actuated position to an actuated position;

an accumulator piston slidably received within said second bore for movement from said pre-actuated position to said actuated position;

a spring disposed within said second bore for biasing said accumulator piston toward said passageway and maintaining a constant level of fluid pressure within said first and second chambers of said housing;

an exhaust port in communication with said second bore wherein said second piston is biased to a position between said passageway and said exhaust port in said pre-actuated position and wherein said second piston is biased so that said exhaust port is located between said passageway and said second piston when in said actuated position to allow said fluid to escape through said exhaust port; and said passageway having a smaller cross-sectional opening than the smallest cross-sectional opening of said first and second bores.

13. A dampening apparatus comprising:

a fluid filled housing having a first open end bore, a second bore, and a passageway therebetween;

an actuator piston having a piston head and a piston rod integrally connected thereto, wherein said piston head is slidably received within said forst bore and said piston rod extends outward from the open end of said first bore for movement from a pre-actuated position to an actuated position;

a spring disposed within said second bore for biasing said accumulator piston toward said passageway and maintaining a constant level of fluid pressure within said first and second bores of said housing;

an exhaust port in communication with said second bore wherein said accumulator piston is biased to a position between said passageway and said exhaust port in said pre-actuated position, and wherein said accumulator piston is biased so that said exhaust port is located between said passageway and said accumulator piston when in said actuated position to allow said fluid to escape through said exhaust port, and a shear pin connected to said housing and said actuator piston to hold said actuator piston in said pre-actuated position, and said shear pin shearing under a predetermined load applied to said actuator piston allowing said actuator piston to be driven to said actuated position.

14. A dampening apparatus comprising:

a housing having a first open-ended bore, a second close-ended bore, and a passageway connecting said first bore to said second bore;

an actuator piston having a piston head and a piston rod integrally connected thereto, wherein said piston head is slidably and sealably received within said first bore, and said piston rod extends from the open end of said first bore for movement from a pre-actuated position to an actuated position;

a shear pin extending from said housing and into said actuator piston head to hold said actuator piston in said pre-actuated position, and said shear pin shearing under a predetermined load applied to said actuator piston allowing said actuator piston to be driven to said actuated position;

an accumulator piston slidably and sealably received within said second bore for movement from said pre-actuated position to said actuated position;

a fluid medium disposed within said first bore between said passageway and said piston head, disposed within said passageway, and disposed within said second bore between said passageway and said accumulator piston;

a compression spring disposed within said second bore for biasing said accumulator piston toward said passageway and maintaining a constant level of fluid pressure within said first bore, said second bore, and said passageway; and an exhaust port in communication with said second bore wherein said accumulator piston is disposed between said passageway and said exhaust port in said pre-actuated position, and wherein said exhaust port is located between said passageway and said accumulator piston when in said actuated position to allow said fluid to escape through said exhaust port.

15. The dampening apparatus stated in claim 14, further comprising:

said first bore and said second bore each having a longitudinal axis wherein said longitudinal axes of said first and second bores are substantially parallel and axially spaced.

16. The dampening apparatus stated in claim 15, further comprising:

said passageway having a longitudinal axis that is substantially perpendicular to said longitudinal axis of said first bore and said second bore.

17. The dampening apparatus stated in claim 15, further comprising:

said passageway having a smaller cross-sectional opening than the smallest cross-sectional opening of said first and second bores.

18. The dampening apparatus stated in claim 14, further comprising:

said piston rod engageable with a fin of a drone to dampen the speed at which said fin deploys from a retracted position on said drone.

* * * * *

UNITED STATES PATENT AND TRADEMARK OFFICE
CERTIFICATE OF CORRECTION

PATENT NO. : 6,609,597 B1
DATED : August 26, 2003
INVENTOR(S) : Heideman

It is certified that error appears in the above-identified patent and that said Letters Patent is hereby corrected as shown below:

Column 2,
Line 36, delete "Position" and insert -- position --;
Line 42, delete "own" and insert -- shown --;

Column 3,
Line 51, delete "pre-actuation" and insert -- pre-actuated --;

Column 4,
Line 34, delete "comers" and insert -- corners --;

Column 6,
Line 47, before "first" please insert -- a --;

Column 7,
Line 63, after "port" please delete ";";

Column 8,
Line 41, delete "forst" and insert -- first --;
Lines 44-45, please insert the following paragraph:
-- an accumulator piston slidably received within said second bore for movement from said pre-actuated position to said actuated position --.

Signed and Sealed this

Second Day of December, 2003

JAMES E. ROGAN
*Director of the United States Patent and Trademark Office*